United States Patent
Bhide et al.

(10) Patent No.: US 10,762,274 B2
(45) Date of Patent: Sep. 1, 2020

(54) EXECUTION OF AN APPLICATION USING A SPECIFICALLY FORMATTED INPUT

(71) Applicant: International Business Machines Corporation, Armonk, NY (US)

(72) Inventors: Manish Bhide, Serilingamaplly (IN); Purna Chandra Jasti, Hyderabad (IN); Vijay Kumar Ananthapur Bache, Bangalore (IN); Phani Kumar V. U. Ayyagari, Hyderabad (IN); Madan K. Chukka, Hyderabad (IN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/011,228

(22) Filed: Jun. 18, 2018

(65) Prior Publication Data

US 2019/0384804 A1    Dec. 19, 2019

(51) Int. Cl.
  *G06F 40/103* (2020.01)
  *H04M 3/42* (2006.01)
  *G06F 9/54* (2006.01)
  *G06F 40/211* (2020.01)

(52) U.S. Cl.
  CPC .............. *G06F 40/103* (2020.01); *G06F 9/54* (2013.01); *G06F 40/211* (2020.01); *H04M 3/42348* (2013.01)

(58) Field of Classification Search
  CPC ........ G06F 17/211; G06F 9/54; G06F 17/271; H04M 3/42348
  See application file for complete search history.

(56) References Cited

U.S. PATENT DOCUMENTS

| | | | | |
|---|---|---|---|---|
| 5,512,921 | A * | 4/1996 | Mital | G06T 9/005 345/555 |
| 7,607,100 | B2 | 10/2009 | Perepa et al. | |
| 8,380,747 | B2 * | 2/2013 | Dargahi | G06Q 10/00 707/796 |
| 8,656,274 | B2 | 2/2014 | Kashi | |
| 9,092,400 | B1 | 7/2015 | Lin et al. | |
| 9,842,113 | B1 * | 12/2017 | Sorvillo | G06F 16/156 |
| 2006/0187900 | A1 * | 8/2006 | Akbar | H04M 7/0066 370/352 |

(Continued)

FOREIGN PATENT DOCUMENTS

WO    WO-2012125653 A1 *  9/2012  ......... G06F 17/2765

OTHER PUBLICATIONS

P. Mell et al., "The NIST Definition of Cloud Computing", National Institute of Standards and Technology, Information Technology Laboratory, Sep. 2011, pp. 1-7.

*Primary Examiner* — Mandrita Brahmachari
(74) *Attorney, Agent, or Firm* — Law Office of Jim Boice

(57) ABSTRACT

A method controls execution of an intended application. One or more processors receive a first formatted character string that is in a first format. The processor(s) determine which application from multiple applications is an intended application that is to use the first formatted character string as a basis of an input to the intended application. The processor(s) convert the first formatted character string into a second formatted character string by applying a second format that is used by the intended application, and then execute the intended application by using the second formatted character string as an input to the intended application.

18 Claims, 8 Drawing Sheets

(56) References Cited

U.S. PATENT DOCUMENTS

| | | | | |
|---|---|---|---|---|
| 2006/0227760 A1* | 10/2006 | Elbæk | ............... | H04M 1/2535 |
| | | | | 370/352 |
| 2008/0276193 A1* | 11/2008 | Pettinati | ............... | G06F 3/0489 |
| | | | | 715/780 |
| 2009/0287470 A1* | 11/2009 | Farnsworth | ............ | G06F 17/27 |
| | | | | 704/3 |
| 2010/0005426 A1* | 1/2010 | Van | ........................ | G06Q 30/02 |
| | | | | 715/860 |
| 2010/0281314 A1* | 11/2010 | Pettinati | ............... | G06F 3/0489 |
| | | | | 714/57 |
| 2014/0028684 A1* | 1/2014 | Maison | ................ | G06F 40/151 |
| | | | | 345/467 |
| 2014/0058939 A1* | 2/2014 | Savla | .................. | G06Q 20/227 |
| | | | | 705/42 |
| 2015/0324334 A1* | 11/2015 | Lee | ...................... | G06F 40/134 |
| | | | | 715/208 |
| 2015/0331557 A1* | 11/2015 | Fish | .................... | G06F 3/04847 |
| | | | | 715/773 |
| 2015/0346961 A1* | 12/2015 | Cui | ........................ | G06F 9/445 |
| | | | | 715/838 |
| 2016/0078530 A1* | 3/2016 | Zhang | ..................... | G07F 7/12 |
| | | | | 705/35 |
| 2016/0092039 A1* | 3/2016 | Chien | ................. | G06F 3/04886 |
| | | | | 715/752 |
| 2016/0142549 A1 | 5/2016 | Kalmstrom | | |
| 2017/0193469 A1 | 7/2017 | Hernandez | | |
| 2017/0308292 A1* | 10/2017 | Choi | ................... | G06F 3/04842 |
| 2018/0241846 A1* | 8/2018 | Narayanan | ............... | H04L 67/34 |

\* cited by examiner

EXECUTION OF AN APPLICATION USING A SPECIFICALLY FORMATTED INPUT

BACKGROUND

The present invention relates to the field of computers, and particularly to computers that execute applications. Still more particularly, the present invention relates to enabling the execution of a specific application by formatting inputs used by the specific application.

SUMMARY

In one or more embodiments of the present invention, a method controls execution of an intended application. One or more processors receive a first formatted character string that is in a first format. The processor(s) determine which application from multiple applications is an intended application that is to use the first formatted character string as a basis of an input to the intended application. The processor(s) convert the first formatted character string into a second formatted character string by applying a second format that is used by the intended application, and then execute the intended application by using the second formatted character string as an input to the intended application.

In one or more embodiments of the present invention, the method is performed through the use of a computer program product and/or computer system.

DETAILED DESCRIPTION

Figure 1:
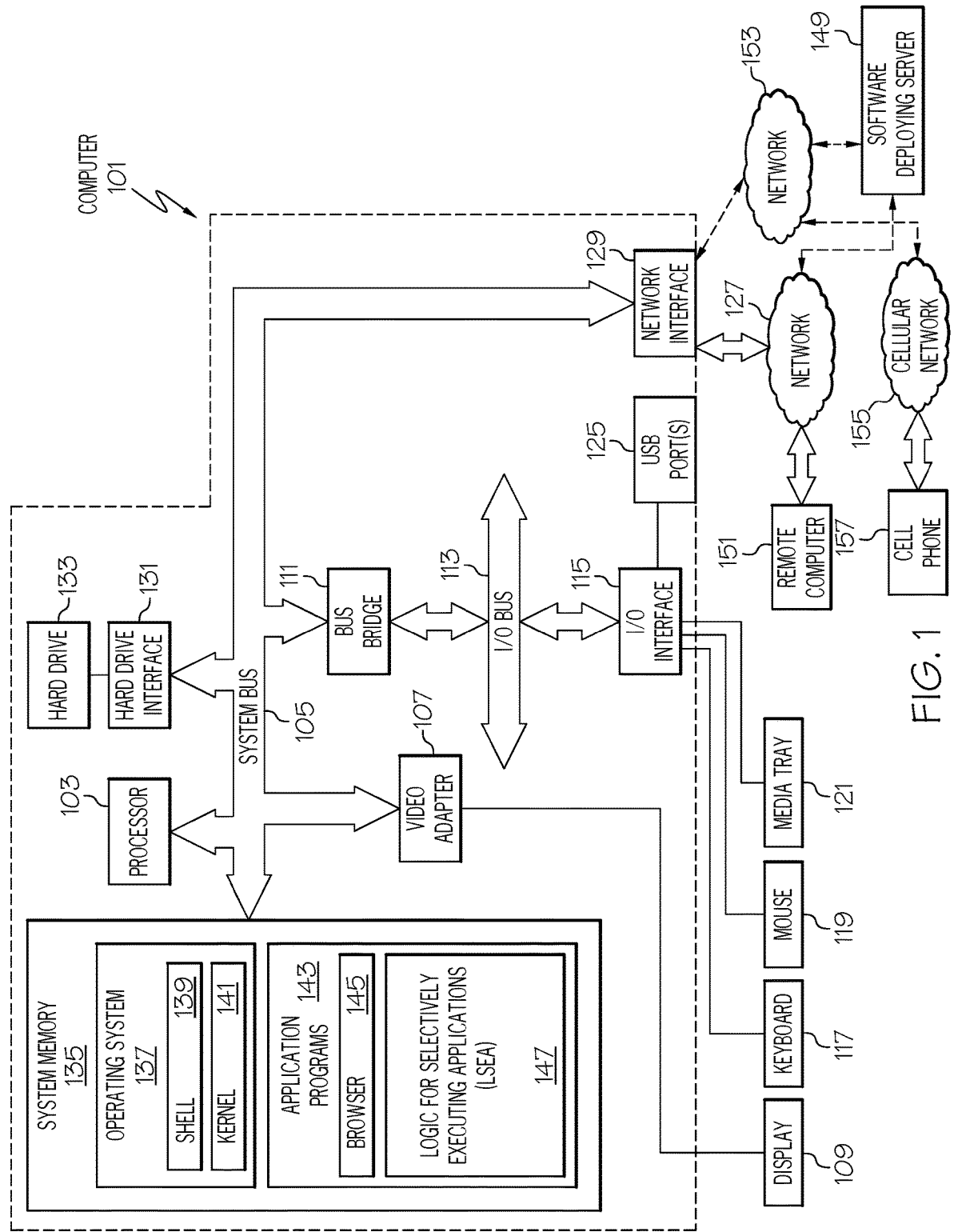
FIG. 1 depicts an exemplary system and network in which the present disclosure may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Hash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

With reference now to the figures, and in particular to FIG. 1, there is depicted a block diagram of an exemplary system and network that may be utilized by and/or in the implementation of the present invention. Some or all of the exemplary architecture, including both depicted hardware and software, shown for and within computer 101 may be utilized by software deploying server 149 and/or a remote computer 151 and/or a cell phone 157 shown in FIG. 1.

Exemplary computer 101 includes a processor 103 that is coupled to a system bus 105. Processor 103 may utilize one or more processors, each of which has one or more processor cores. A video adapter 107, which drives/supports a display 109 (which may be a touch-screen display capable of detecting touch inputs onto the display 109), is also coupled to system bus 105. System bus 105 is coupled via a bus bridge 111 to an input/output (I/O) bus 113. An I/O interface 115 is coupled to I/O bus 113. I/O interface 115 affords communication with various I/O devices, including a keyboard 117, a mouse 119, a media tray 121 (which may include storage devices such as CD-ROM drives, multimedia interfaces, etc.), and external USB port(s) 125. While the format of the ports connected to I/O interface 115 may be any known to those skilled in the art of computer architecture, in one embodiment some or all of these ports are universal serial bus (USB) ports.

As depicted, computer 101 is able to communicate with a software deploying server 149 and/or other devices/systems using a network interface 129. Network interface 129 is a hardware network interface, such as a network interface card (NIC), etc. Network 127 may be an external network such as the Internet, or an internal network such as an Ethernet or a virtual private network (VPN). In one or more embodiments, network 127 is a wireless network, such as a Wi-Fi network, a cellular network, etc.

A hard drive interface 131 is also coupled to system bus 105. Hard drive interface 131 interfaces with a hard drive 133. In one embodiment, hard drive 133 populates a system memory 135, which is also coupled to system bus 105. System memory is defined as a lowest level of volatile memory in computer 101. This volatile memory includes additional higher levels of volatile memory (not shown), including, but not limited to, cache memory, registers and buffers. Data that populates system memory 135 includes computer 101's operating system (OS) 137 and application programs 143.

OS 137 includes a shell 139, for providing transparent user access to resources such as application programs 143. Generally, shell 139 is a program that provides an interpreter and an interface between the user and the operating system. More specifically, shell 139 executes commands that are entered into a command line user interface or from a file. Thus, shell 139, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 141) for processing. While shell 139 is a text-based, line-oriented user interface, the present invention will equally well support other user interface modes, such as graphical, voice, gestural, etc.

As depicted, OS 137 also includes kernel 141, which includes lower levels of functionality for OS 137, including providing essential services required by other parts of OS 137 and application programs 143, including memory management, process and task management, disk management, and mouse and keyboard management.

Application programs 143 include a renderer, shown in exemplary manner as a browser 145. Browser 145 includes program modules and instructions enabling a world wide web (WWW) client (i.e., computer 101) to send and receive network messages to the Internet using hypertext transfer protocol (HTTP) messaging, thus enabling communication with software deploying server 149 and other systems.

Application programs 143 in computer 101's system memory (as well as software deploying server 149's system memory) also include a Logic for Selectively Executing Applications (LSEA) 147. LSEA 147 includes code for implementing the processes described below, including those described in FIGS. 2-6. In one embodiment, computer 101 is able to download LSEA 147 from software deploying server 149, including in an on-demand basis, wherein the code in LSEA 147 is not downloaded until needed for execution. In one embodiment of the present invention, software deploying server 149 performs all of the functions associated with the present invention (including execution of LSEA 147), thus freeing computer 101 from having to use its own internal computing resources to execute LSEA 147.

The hardware elements depicted in computer 101 are not intended to be exhaustive, but rather are representative to highlight essential components required by the present invention. For instance, computer 101 may include alternate memory storage devices such as magnetic cassettes, digital versatile disks (DVDs), Bernoulli cartridges, and the like. These and other variations are intended to be within the spirit and scope of the present invention.

Users of electronic devices (e.g., smart phones, laptop computers, tablet computers, etc.) often receive numbers (numerals) in content received as email, text messages, instant messages, etc. These numbers can be a contact number (e.g., a telephone number), a reference number (e.g., a number that identifies a particular topic), a transaction number (e.g., a number that identifies an e-commerce transaction), a verification code (e.g., a password for opening a file), etc. If the number has a large quantity of digits, the readability for the user becomes difficult. Furthermore, if the user needs to read that number aloud to someone, it often becomes confusing if the number is a complex combination of digits (e.g., having 5 consecutive zeros in a 10-digit number).

Though applications (apps) on mobile devices witness a major portion of their data as numbers, there are currently no useful processes in the prior art for improving the readability of such numbers in such scenarios.

Furthermore, the prior art does not provide 1) a useful way of formatting a received number for use by a particular application, nor 2) a way for the system to heuristically learn what that particular application is.

For example, assume that a number is a telephone number. Assume further that the user wants to use a Voice over Internet Protocol (VoIP) app for any calls made to an overseas number, but the user wants to use a local cell phone app for any calls to a local number. As such, in one or more embodiments of the present invention, when the local computing device within a country (Country A) receives a telephone number that is in a foreign country (Country B) (e.g., a user in Country A receives a text message that says, "Call me at 512-555-1234"), the local computing device will open up the VoIP app. However, if the local computing device being used by the user in Country A receives a number that is local (i.e., a phone number in Country A), then the local computing device will use a cellular network service local to and within Country A to place the phone call.

In an embodiment of the present invention, the user is given a set of suggestions for a particular app to use, based on the number format. For example, assume that the user receives a text message that includes the number "1234". The system will recognize that this is not a telephone number, but recognizes that this number may be a password for a database, a transaction number to identify a particular transaction, etc. The system initially suggests a database app (e.g., for accessing data from a database) and a transaction app (e.g., for placing an order on the Internet) that the user can open in order to use "1234" as an input to the app. However, the user recognizes that "1234" is probably a password for the database app, since he/she has recently used the database app, and since he/she has not used the transaction app in several months. The user thus selects the database app, and inputs the number "1234" into the now opened database app (e.g., by a cut-and-paste operation). If this operation unlocks the database in the database app, the system will learn that future received four-digit numbers are likely to be for this database app, and optionally will open that database app automatically every time a four-digit number is received (e.g., in a text message).

In one or more embodiments, the present invention allows a user to select a particular application according to what function is provided. For example, consider the graphical user interface (GUI) 202 shown in FIG. 2. Assume that GUI 202 is being displayed on the display 109 of computer 101 shown in FIG. 1. As shown in block 204, assume further that computer 101 has received the number "5000000000067777789" in a message (e.g., a text message, an email, etc.) from remote computer 151, from the local keyboard 117, or as an output of some application (not shown) running on computer 101. When "5000000000067777789" is input to Application A, the Application A uses this input to perform Function A, as shown in table 206. For example, assume that Function A is access to a bank account, which is provided by Application A. Although Application A (as well as other applications shown in table 206) is not active/open while initially shown in table 206, if Application A were to be opened/activated, it would provide access to the bank account ("Function A") by inputting "5000000000067777789" into Application A after it is activated/opened/enabled.

Similarly, Application B (if activated) may open an alternate network 153 between computer 101 and software deploying server 149 (or any other remote device), as indicated by the associated and displayed Function B. If the user knows that he/she wants to activate/open up network 153, then clicking "Application B" will open Application B, causing a field to appear on display 109 for accepting "5000000000067777789" as an input to Application B. Alternatively, opening Application B automatically inputs "5000000000067777789" into Application B. In either embodiment, in response to Application B being opened and "5000000000067777789" being input into Application B, network 153 is activated (i.e., a requisite port on network interface 129 is opened, routers/switches (not shown) inside network 153 are turned on and/or instructed to handle communication packets between computer 101 and software deploying server 149, appropriate input/output ports are opened in network interface 129, etc.).

Similarly, Application C (if activated) may perform Function C, which is displaying "5000000000067777789" in a more readable format. For example, assume that the user has clicked box 208, indicating that he/she is interested in Function C being provided. Assume that Function C modifies a long number in order to allow it to be displayed in manner that makes the number easier to read. Thus, clicking box 208 causes the computer 101 to open Application C. Once opened, Application C will receive "5000000000067777789" automatically (by extracting it from the message that contained this number) or manually (as a user input). This causes the GUI 301 shown in FIG. 3 to shown "5000000000067777789" as a first formatted character stream, as shown in box 303. Function C is the transformation of "5000000000067777789" into a format that is easier for a user to read (silently or aloud). For example, as shown in box 305, Application C converts "5000000000067777789" (the first formatted character stream) into "5(0)106(7)589", which the user understands as "5 followed by ten zeros followed by 6 followed by five sevens followed by 8 followed by 9". Alternatively, "5000000000067777789" may be converted into the second formatted character stream shown in box 307 ("5 (0×10) 6 (7×5) 8 9"), which is also read as "5 followed by ten zeros followed by 6 followed by five sevens followed by 8 followed by 9".

In one or more embodiments, the present invention uses an operating system level application programming interface (API), which can be used by multiple applications to modify a format of a received number, in order to make that received number usable as an input to one or more of the multiple applications.

Figure 4:
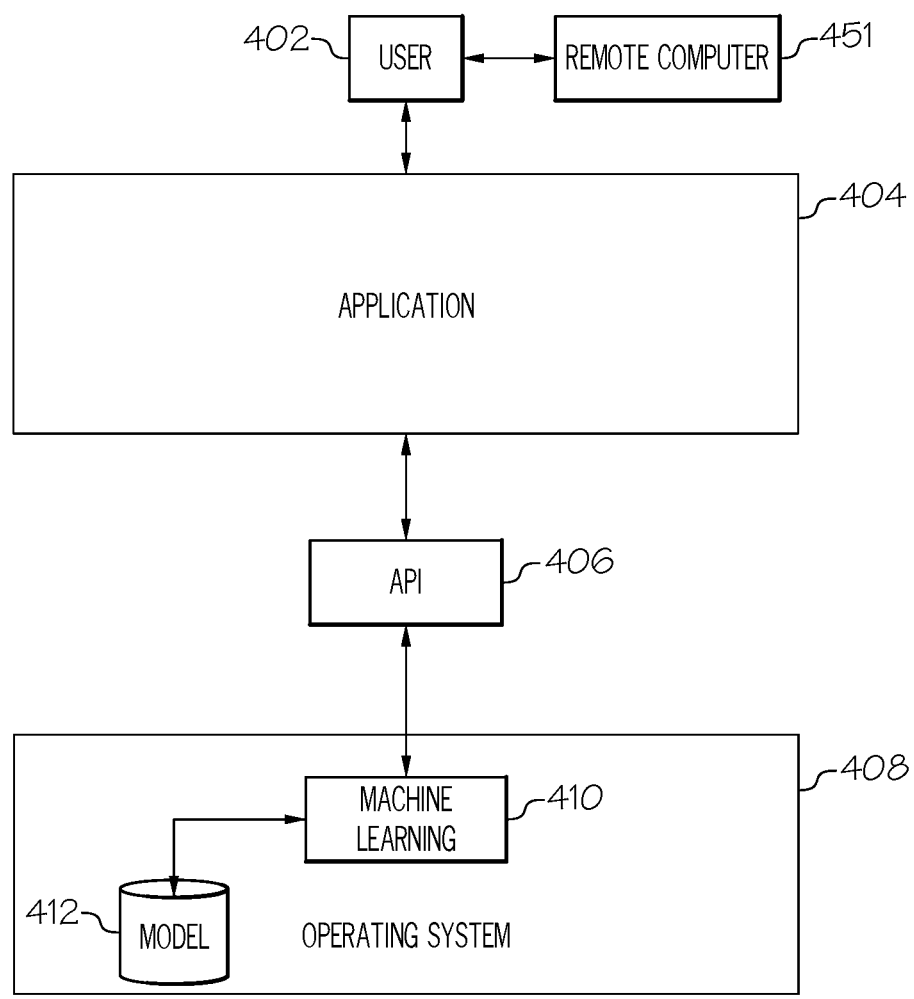
FIG. 4 illustrates an application programming interface (API) used to select and execute a particular application using inputs that have been converted to a particular format.

For example, as shown in the exemplary system structure depicted in FIG. 4, a user 402 interacts with one or more applications, including the depicted application 404, on a computing device (e.g., computer 101 shown in FIG. 1). The application 404 interfaces with an operating system 408 via an application programming interface (API) 406 (i.e., a set of subroutines, protocols, and other tools used to interface between application 404 and the machine learning 410 that is part of the operating system 408).

That is, the operating system 408 exposes the API 406, which can be used by multiple applications (including application 404). In the example described in FIG. 3, assume that the application 404 is an application for converting "5000000000067777789" into "5(0)106(7)589" for display on GUI 301. By receiving the user input selecting Application C shown in FIG. 2, API 406 can perform the following reformatting of various strings of numerals.

Consecutive Digits in a Number

As described above with regard to exemplary Application C (shown in FIG. 2), if a number has consecutive digits within that number, it is very difficult for a user to read that number out aloud. As such, API 406 contains logic that shows a count of those consecutive digits and truncates those digits so that the user can quickly read the count of digits between the numbers. (See FIG. 3.)

Splitting Digits in a Number

If the number has a large quantity of digits, it is difficult for a user to verbally recite the number to someone or to enter the number in some other place (say a web page). For example, the phone number 8886442400 is not as readable as 888-644-2400. Thus, the readability of the number improves if it is split properly. Besides splitting the number for readability, the API 406 causes the number 8886442400 to be split according to the way the application requires.

For example, if the application 404 is a telecommunication application, that telecommunication application may require the number 8886442400 to be reformatted into 888-644-2400 when called by the telecommunication application. However, if the application 404 is A banking application, that telecommunication application may require the number 8886442400 to be reformatted into banking routing number 888644240 (last number/zero truncated/deleted) in order to be executed by the banking application.

Split Based on Region/Location

Large numbers, and particularly currency numbers, are often formatted differently according to different countries. For example, assume that in Country A one hundred thousand dollars is formatted as "$100,000D". However, in Country B, one hundred thousand dollars is formatted as "$1,00,000D". Thus, if a user is in Country A and someone texts that user with a message that says that $1,00,000D is transferred, the user in the Country A likely will not understand what amount of money is being transferred. As such, the API 406 in FIG. 4 will 1) determine the location of the message recipient; 2) reformat "$1,00,000D" into "$100,000D" if that location is Country A; and 3) display "$100,000D" on the display used by application 404 and/or use "$100,000D" as an input to a banking application used by computer 101 shown in FIG. 1.

Split Based on the Field of the Web Page

If a user has to copy a number from one application to some field in another application, the API 406 shown in FIG. 4 splits that number according to the format of the field that another application accepts. For example, a passenger name record (PNR) number is a number that identifies a particular ticket or reservation for a passenger on public transportation (e.g., a train in a particular country). A PNR number may be made up of two fields, in which there are 3 digits in a first field and 7 digits in a second field. The 3 digits in the first field identify a passenger reservation system (PRS) that created the reservation. For example, the PRS may be a consolidated system that makes reservations for all train systems in a particular country. The 7 digits in the second field are unique for a particular reservation, and represent a particular traveler, a particular time/date/route for a train, a particular seat assignment on that train, etc.

If a user selects a number and want to copy the number into PNR fields of the application 404 shown in FIG. 4, the API 406 splits the PNR into the first and second fields. The split PNR gets copied into multiple clipboards, which the user can copy from in order to populate certain fields into application 404. For example, the application 404 may be an application that requires that inputs be in the two field format (3 digits split from another 7 digits). Since the original 10 digit PNR number is now split into two fields (3 digits separate from 7 digits), the itinerary represented by the split PNR number can now be retrieved by application 404 both by the first field and/or the second field. That is, by splitting the PNR number, all reservations made by the PRS can be retrieved using the 3 digits in the first field, or else a particular reservation can be retrieved using all 10 digits from the first field and the second field.

While the user is using the numbers as formatted by API 406, the machine learning 410 also understands the usage of these formatted numbers by the users. That is, machine learning 410 (i.e., a set of logic that operates within the operating system 408) compares the usage of the formatted numbers by one or more users to a current usage. If the current usage matches a model usage in a model database 412 that is also part of the operating system 408, then that model usage is weighted as being more likely to be used in future usages. This semi-supervised learning allows the API 406 to provide suggestions and user behavior predictions based on this model usage, and calls back appropriate methods/functions in the application, to perform a particular action.

For example, assume that user 402 receives the number "1234" in a text message coming from a remote computer 451 (analogous to remote computer 151 shown in FIG. 1). Assume further that the application 404, API 406, and operating system 408 are part of computer 101 shown in FIG. 1. If the user directs application 404 to use this number "1234" as an input, or if application 404 automatically uses "1234" as an input, and application 404 functions properly (e.g., returns data of a predetermined type, creates a travel reservation, opens/activates a network, etc.), then this information is sent to machine learning 410. Machine learning 410 compares the format of the input (i.e., four numbers) and/or the application type of application 404 (e.g., a reservation application) and/or the identity of user 402 and/or the user type (e.g., travel customer) of the current usage to the format/application type/user identity/user type of a model usage. If these saved and current usages match within predetermined ranges (e.g., the number is 4 digits long in the current usage and is 5 digits long in the model usage), then the model usage is weighted more heavily (such that it is more likely to be recommended in the future). If these saved and current usages do not match within the predetermined ranges (e.g., the number is 3 digits long in the current usage and is 5 digits long in the model usage), then the model usage is weighted less heavily (such that it is less likely to be recommended in the future) and/or a new model usage is created and stored in the model database 412 based on the format/application type/user identity/user type of a current usage.

That is, in one or more embodiments of the present invention, the model usage format (e.g., a string of data 4 digits long) is associated with a type of application, and/or a particular user, and/or a particular type of user, etc. in a table (not shown) in the model database 412.

Figure 5:
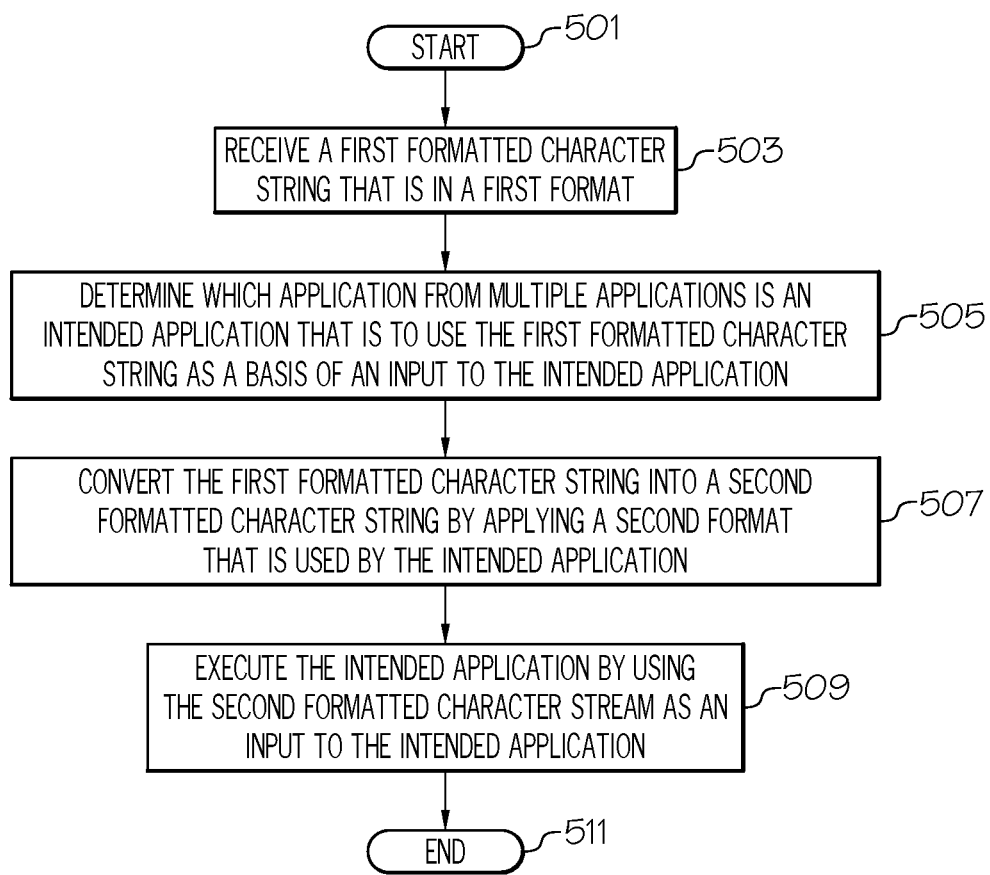
FIG. 5 is a high-level flow chart of one or more steps performed by one or more processors and/or other hardware devices in accordance with one or more embodiments of the present invention.

With reference now to FIG. 5, a high-level flow chart of one or more operations performed by one or more processors (e.g., processor 103 shown in FIG. 1) in accordance with one or more embodiments of the present invention is presented.

After initiator block 501, one or more processors receive a first formatted character string that is in a first format, as described in block 503. For example, computer 101 may receive a text message from remote computer 151 that includes the numeric string "50000000000067777789", which is in the first format of "all numbers displayed in a row with no punctuation, breaks, etc.".

As described in block 505, one or more processors determine which application from multiple applications is an intended application that is to use the first formatted character string as a basis of an input to the intended application. That is, the processor(s) determine which application will be using the information found in the first formatted character string, although that information needs to be converted into a second format before it is used by the intended application. Determining which application is the intended application is achieved in various manners according to various embodiments of the present invention.

For example, in an embodiment of the present invention, one or more processors determine which application from the multiple applications is the intended application based on a length of the first formatted character string. That is, in this example if the original string has ten digits (e.g., "0123456789"), then the system will recognize these as an account number that is used to access information from a particular banking application, even though the digits must be converted from the first format ("0123456789") into a second format (e.g., "01-23456789") in order to access the information provided by the banking application.

In an embodiment of the present invention, the intended application is determined by the context of a message that delivered the first formatted character string. For example, assume that user 402 shown in FIG. 4 (equivalent to computer 101 shown in FIG. 1) receives a message (e.g., an email, a text message, etc.) from a remote computer 451. Computer 101 will then examine the message for its context. For example, if the message is an email that has a subject line of "Banking information", then computer 101 will determine that the intended application that will use information from the first formatted character string is a banking application. Similarly, if the message is a text message that includes words such as "account number" and/or "account balance" and/or "banking", then computer 101 will determine that the intended application that will use information from the first formatted character string is a banking application.

In an embodiment of the present invention, the intended application is determined by the processor(s) (e.g., from computer 101) determining which application is most frequently used by user 402. That is, the processor(s) examine a history of application usage by user 402 (e.g., a record of applications used by user 402) and identify which application is used the most often by user 402. The processor(s) then assume that this most frequently used application is the intended application for using information from the received (first formatted) character string as an input.

In an embodiment of the present invention, the intended application is determined by the processor(s) (e.g., from computer 101) determining which application is most recently used by user 402. That is, the processor(s) examine a history of application usage by user 402 (e.g., a record of applications used by user 402) and identify which application was used most recently by user 402. The processor(s) then assume that this most recently used application will be used again as the intended application that uses information from the received (first formatted) character string as an input.

Returning now to FIG. 5 and as shown in block 507, the processor(s) then convert the first formatted character string into a second formatted character string by applying a second format that is required by the intended application. For example, assume again that the first formatted character string is "50000000000067777789", and the identified application is an application that displays this information on a display. However, in order for the character string "50000000000067777789" to be easy to read, it is first converted into a second format "5(0)106(7)589", as described above.

As shown in block 509, the processor(s) then execute the intended application by using the second formatted character string as an input to the intended application. In the example of the received character string "50000000000067777789" being used as an input to the intended application for readability, it is first converted into the second format "5(0)106(7)589" and then displayed on the computer display.

The flow chart shown in FIG. 5 ends at terminator block 511.

As described herein, in one embodiment of the present invention the first formatted character string is in a first numbering format, the second formatted character string is in a second numbering format, and the first numbering format and the second numbering format differ according to a placement of separation commas in a numeric string. For example, the first formatted character string may use a format of 1,00,000, (which is common in some parts of the world) while the second formatted character string may use the format of 100,000 (common in other areas of the world), or the second formatted character string may use the European format of 100.000. Thus, the system 1) identifies a particular numeric-based application as the intended application; 2) identifies which numbering system is used by that particular numeric-based application; 3) formats the number into the appropriate numbering system for that particular numeric-based application; and then 4) inputs the appropriately formatted number into that particular numeric-based application.

As described herein, in an embodiment of the present invention, the first formatted character string is a string of numbers that includes a series of a consecutively repeated number and the intended application is a display application for displaying numbers on a user interface. In an exemplary embodiment, then, the processor(s) convert the series of the consecutively repeated number into a numeric series descriptor; replace the series of the consecutively repeated number with the numeric series descriptor in the first formatted character string to create a structured character string; and display the second formatted character string on the user interface by executing the display application. For example, assume again that the first formatted character is "50000000000067777789", and the identified application is an application that displays this information on a display. However, in order for the character string "50000000000067777789" to be easy to read, it is first converted into a second format "5(0)106(7)589" before being displayed.

As described above with reference to FIG. 4, in an embodiment of the present invention an application programming interface (API) allows the system to select an intended application from multiple applications and to format input data according to which intended application is selected.

Thus, and as shown in FIG. 4, an application program interface (API) 404 that is in communication with an operating system 408 of a computer (e.g., computer 101 shown in FIG. 1) receives a user input (e.g., from user 402) that identifies the intended application that uses the second format. That is, the user may simply select a particular application (according to its function), as described in FIG. 2.

The operating system 408 compares the second format to a model structured format (described in model database 412 shown in FIG. 4), which holds the format(s) that is/are required to be used by inputs to the intended application. If the operating system 408 determines that the model structured format is inappropriate for inputs to the intended application, then the operating system 408 modifies the model structured format to match the second format, and stores that modified model structure format in the model database 412. Subsequently, the API 406 receives a second character string for use by the intended application. Rather than apply the earlier version of the model structure format, the API applies the new modified model structure format to the second character string in order to create a new input for the intended application.

In an embodiment of the present invention, the second formatted character string is a telephone number that is used in a particular country. In this embodiment, the processor(s) extract an area code from the telephone number in order to identify a geographic area that uses the telephone number. The processor(s) determine that the intended application uses an Internet-based telephone network for all calls to that geographic area, and initiate a telephonic session in the Internet-based telephone network using the telephone number as an input to the intended application.

For example, consider network 127 and cellular network 155 shown in FIG. 1. If a call is local, then computer 101 (e.g., a smart phone) uses cellular network 155 to complete the call to a cell phone 157 that uses that phone number within the same country in which the computer 101 is located. However, if the telephone number is for a smart phone that is in another country (depicted as remote computer 151), then the call is made over network 127 (i.e., the Internet) as a Voice over Internet Protocol (VoIP) call. Thus, the API 406 shown in FIG. 4 is able to 1) determine where the receiving telephone is located (based on the area code in the telephone number), and 2) selectively route the phone call to the receiving telephone as a cellular call or a VoIP call, based on where the receiving telephone is located. More specifically, the API 406 directs the network interface 129 to selectively route the call through the Internet network 127 or the cellular network 155 based on where the receiving telephone is located.

In another embodiment, the first formatted character string is received by a local computer (e.g., computer 101 shown in FIG. 1) from a first remote computer (e.g., remote computer 151 shown in FIG. 1) via a first network (e.g., network 127 shown in FIG. 1). As such, executing the intended application causes a second network (e.g., network 153 or cellular network 155) to become active in order to enable a communication session between the local computer and a second remote computer (e.g., software deploying server 149 or cell phone 157) via the second network. That is, executing the intended application (e.g., a banking application) not only activates that application, but also selects which network is used to access information (e.g., bank account information). For example, assume that computer 101 receives a text message containing a bank account number from a cell phone 157 via the cellular network 155. Upon receiving this bank account number, the computer 101 will activate a port in the network interface 129 that is connected to the network 127, thus opening up a communication session between the computer 101 and the remote computer 151 (e.g., a server operated by a bank). Thus, the system is more secure since the bank account number is sent over the cellular network 155, while the bank account information is retrieved over an unrelated network 127. This provides additional security, since the first formatted character string will not look like a banking account number (e.g., the first formatted character string looks like "xx-xx-xxxxxx"). However, the system will convert this string into a second format that is used as a bank account number ("xxxxxxxxxx"), which is transmitted over a different network. If this different network supports encryption, then the system is even more secure.

Figure 2:
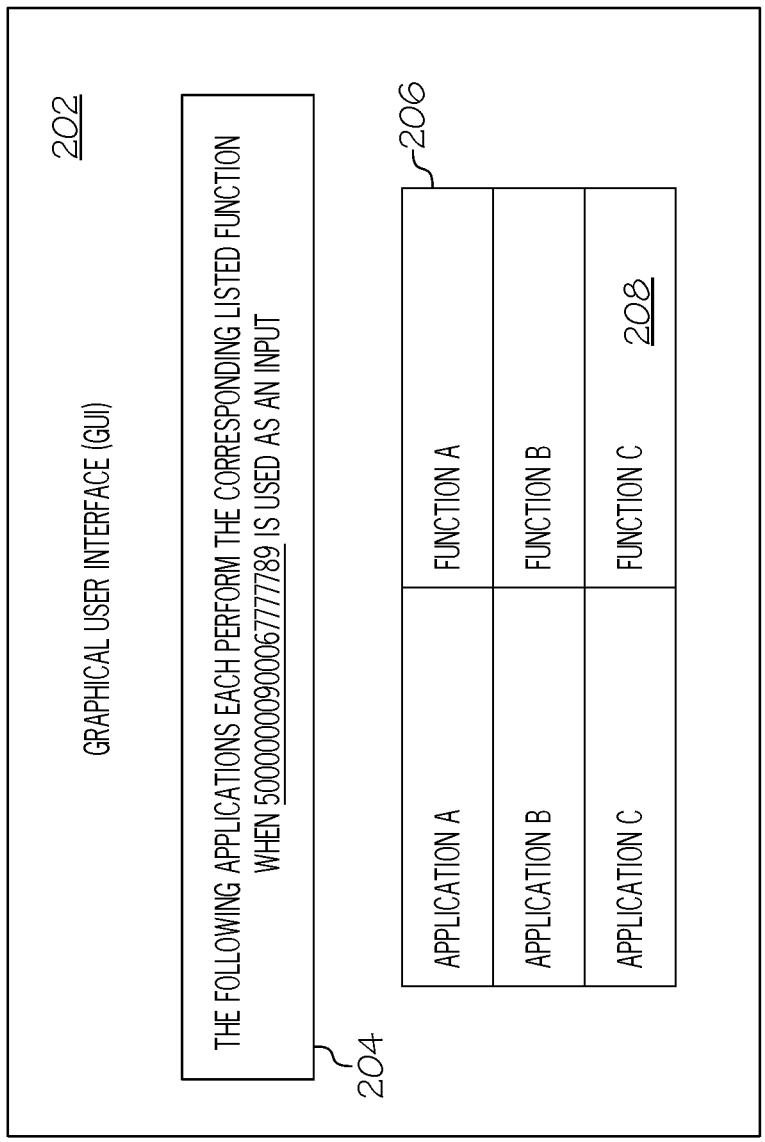
FIG. 2 illustrates an exemplary graphical user interface (GUI) that allows a user to select a particular application based on the function(s) that the particular application provides.
Figure 3:
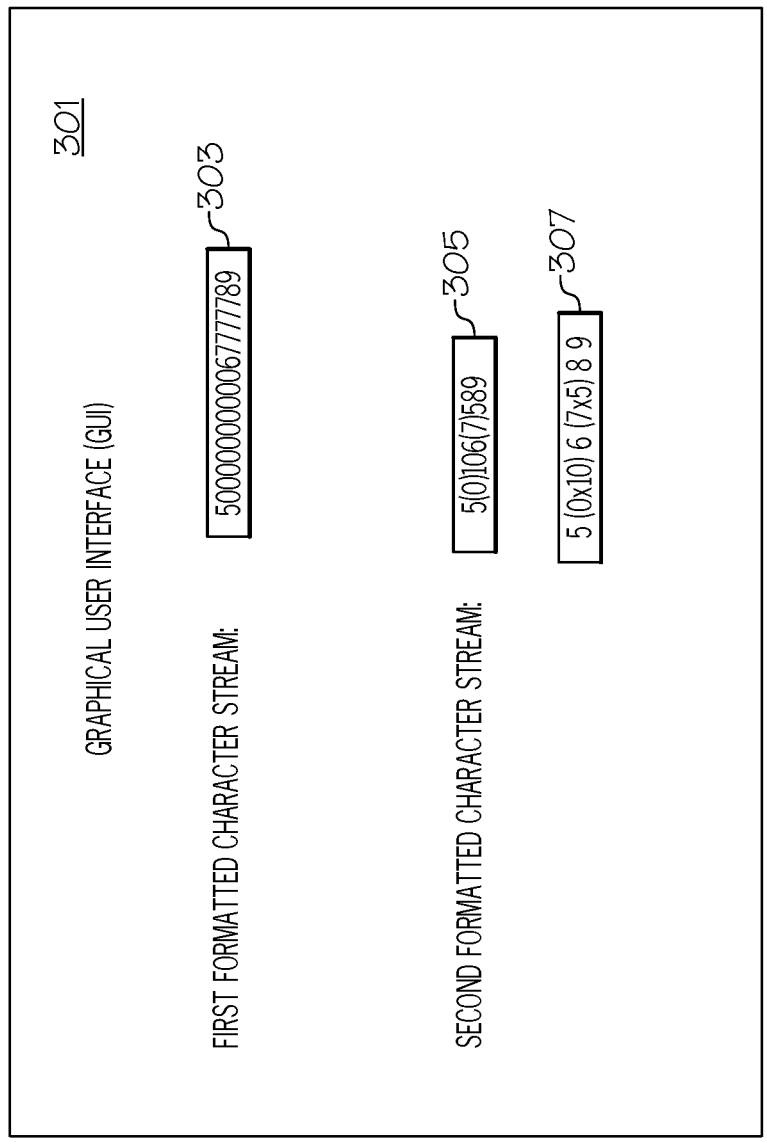
FIG. 3 depicts a particular application that displays a long character stream in a more readable form.
Figure 6:
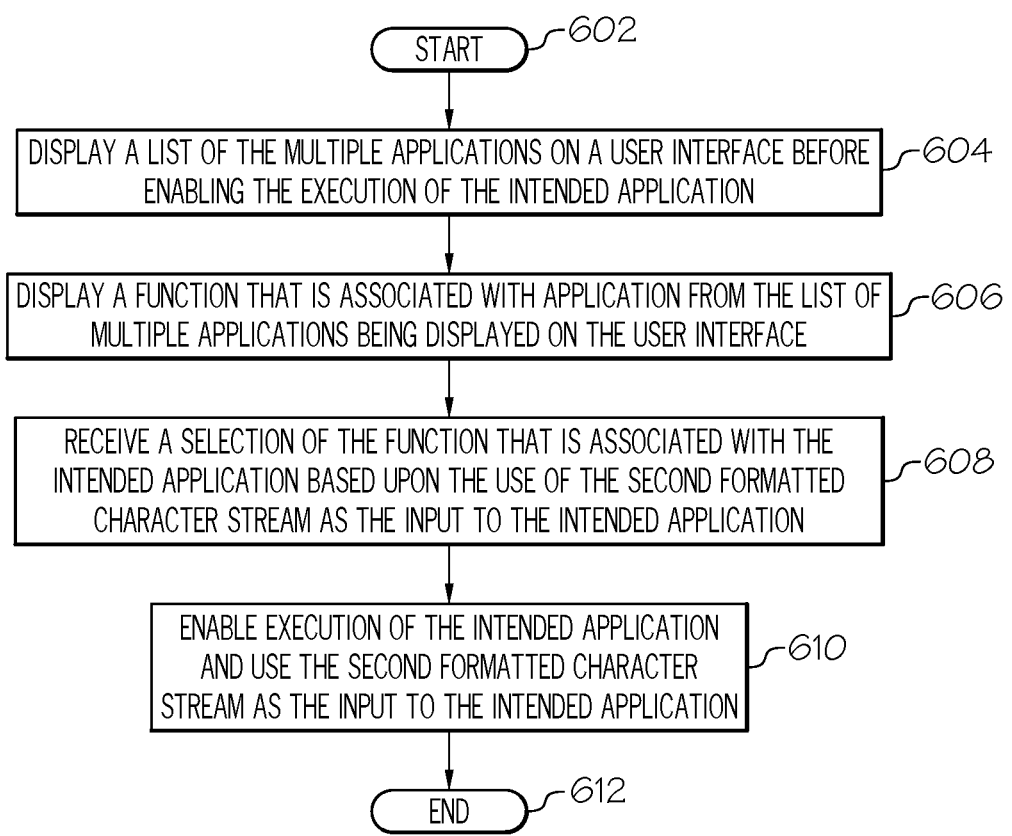
FIG. 6 is a high-level flow chart of one or more steps performed by one or more processors and/or other hardware devices for enabling particular applications in accordance with one or more embodiments of the present invention.

As described in FIG. 2, multiple applications, which are initially closed (and thus inactive) can be displayed on a GUI 202 in a table 206, along with their respective functions. As such, FIG. 6 is a high-level flow chart of one or more operations performed by one or more processors (e.g., processor 103 shown in FIG. 1) to activate and enable execution of an intended application in accordance with one or more embodiments of the present invention is presented.

After initiator block 602, the processor(s) display a list of the multiple applications on a user interface before enabling the execution of the intended application, as described in block 604. The multiple applications are not executable while being displayed in the list on the user interface shown in FIG. 2.

As described in block 606, the processor(s) display a function (e.g., "Function C" that is shown in box 208) that is associated with the intended application from the list of multiple applications being displayed on the user interface. The function is dependent upon use of the second formatted character string as an input to each of the multiple applications. That is, if Function C (e.g., opening up access to bank account information) is desired, then the account number used as an input must be in a certain format (e.g., "xx-xxxxxxxx").

As described in block 608, the processor(s) receive a selection of the function that is associated with the intended application based upon the use of the second formatted character string as the input to the intended application. That is, if the user 402 or the API 406 convert "xxxxxxxxxx" into "xx-xxxxxxxx", then the system knows that the desired function (e.g., Function B shown in FIG. 2) is to access bank account information, which is associated with a certain intended application (e.g., Application B shown in FIG. 2).

As described in block 610, in response to receiving the selection of the function that is associated with the intended application, the processor(s) enable execution of the intended application and use the second formatted character string as the input to the intended application. That is, once the intended application is identified by the properly formatted string, then that properly formatted string is input into the intended application, which is automatically executed using the properly formatted string.

The flow chart shown in FIG. 6 ends at terminator block 612.

Similarly, Application B (if activated) may open an alternate network 153 between computer 101 and software deploying server 149 (or any other remote device), as suggested by associated and displayed Function B. If the user knows that he/she wants to activate/open up network 153, then clicking "Application B" will open Application B, causing a field to appear on display 109 for accepting the input "50000000000067777789" by a user input. Alternatively, opening Application B automatically inputs "50000000000067777789" into Application B. In either embodiment, in response to Application B being opened and "50000000000067777789" being input into Application B, network 153 is activated (i.e., a requisite port on network interface 129 is opened, routers/switches (not shown) inside network 153 are turned on and/or instructed to handle communication packets between computer 101 and software deploying server 149, etc.).

Thus, the present invention improves a functionality of computer 101 shown in FIG. 1 by converting data inputs into a format required by an intended application, thus allowing the intended application to operate properly.

Furthermore, one or more embodiments of the present invention allows the system to match incoming data to a particular intended application, such that the intended application can execute automatically when the incoming data is received. That is, once the incoming data is converted into the second formatted character string, the system will execute the intended application that was identified by the length of the incoming data, an application usage history, context of a message that sent the incoming data, etc. This enables the system to select and activate an intended application more quickly and efficiently than processes used in the prior art, in which the intended application often failed due to improperly formatted input data.

The present invention may be implemented in one or more embodiments using cloud computing. Nonetheless, it is understood in advance that although this disclosure includes a detailed description on cloud computing, implementation of the teachings recited herein is not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 7:
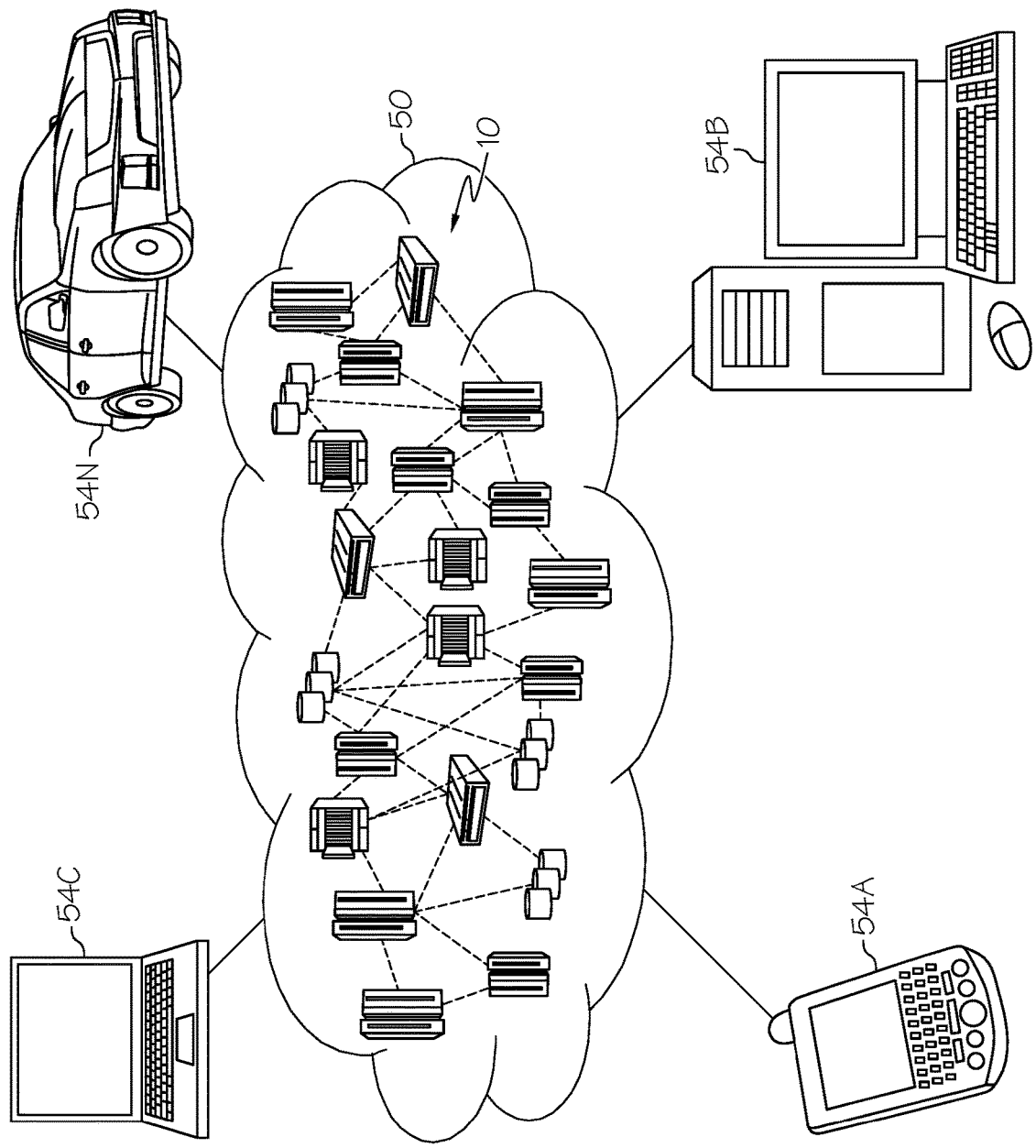
FIG. 7 depicts a cloud computing environment according to an embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-54N shown in FIG. 7 are intended to be illustrative only and that computing nodes 10 and cloud computing environment 50 can communicate with any type of computerized device over any type of network and/or network addressable connection (e.g., using a web browser).

Figure 8:
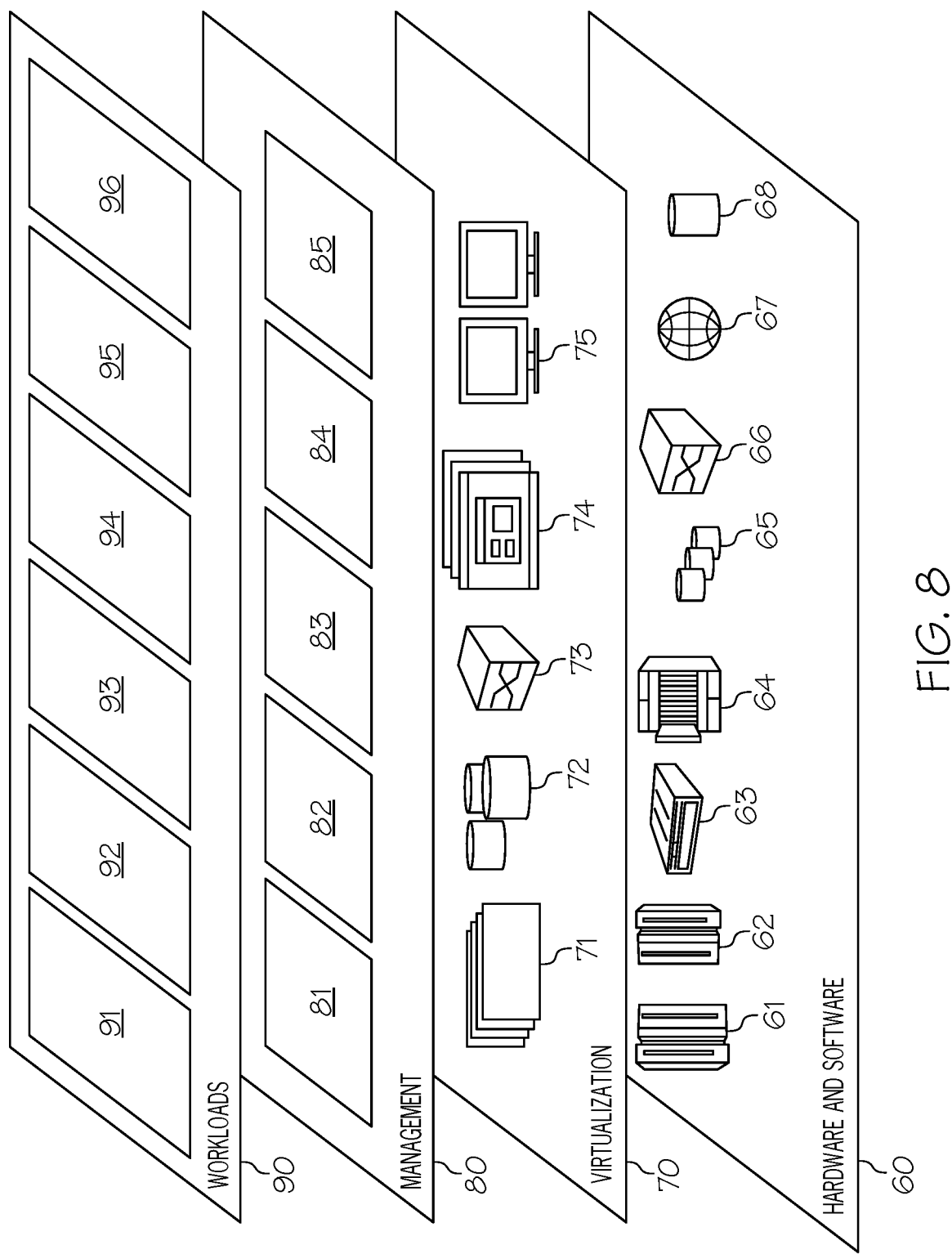
FIG. 8 depicts abstraction model layers of a cloud computer environment according to an embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and application enablement processing 96, which performs one or more of the features of the present invention described herein.

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of various embodiments of the present invention has been presented for purposes of illustration and description, but is not intended to be exhaustive or limited to the present invention in the form disclosed. Many modifications and variations will be apparent to those of ordinary skill in the art without departing from the scope and spirit of the present invention. The embodiment was chosen and described in order to best explain the principles of the present invention and the practical application, and to enable others of ordinary skill in the art to understand the present invention for various embodiments with various modifications as are suited to the particular use contemplated.

Any methods described in the present disclosure may be implemented through the use of a VHDL (VHSIC Hardware Description Language) program and a VHDL chip. VHDL is an exemplary design-entry language for Field Programmable Gate Arrays (FPGAs), Application Specific Integrated Circuits (ASICs), and other similar electronic devices. Thus, any software-implemented method described herein may be emulated by a hardware-based VHDL program, which is then applied to a VHDL chip, such as a FPGA.

Having thus described embodiments of the present invention of the present application in detail and by reference to illustrative embodiments thereof, it will be apparent that modifications and variations are possible without departing from the scope of the present invention defined in the appended claims.

What is claimed is:

1. A method comprising:
    receiving, by one or more processors, a first formatted character string that is in a first format;
    determining, by one or more processors, which application from multiple applications is an intended application that is to use the first formatted character string as a basis of an input to the intended application;

converting, by one or more processors, the first formatted character string into a second formatted character string by applying a second format that is required by the intended application;

executing, by one or more processors, the intended application by using the second formatted character string as an input to the intended application;

retrieving, by one or more processors, a model usage from a database located in an operating system used by a computer that receives the first formatted character string, wherein the computer is used by a current user, and wherein the model usage describes a data format of data used by the intended application, an application type of the intended application, and a user type of users that historically utilize the intended application;

matching, by one or more processors, a new data format of a new formatted character string, which is received by a new user, and a new user type of the new user to information in the model usage; and in response to the new data format of the new formatted character string and the new user type of the new user matching the information in the model usage, utilizing, by one or more processors, the data format of data used by the intended application, the application type of the intended application, and the user type of users that historically utilize the intended application from the model usage to identify the intended application for use by the new user and to convert the first formatted character string into the second formatted character string for use by the intended application.

2. The method of claim 1, further comprising:
determining, by one or more processors, which application from the multiple applications is the intended application based on a length of the first formatted character string.

3. The method of claim 1, wherein the first formatted character string is a string of numbers that includes a series of a consecutively repeated number, wherein the intended application is a display application for displaying numbers on a user interface, and wherein the method further comprises:
converting, by one or more processors, the series of the consecutively repeated number into a numeric series descriptor;
replacing, by one or more processors, the series of the consecutively repeated number with the numeric series descriptor in the first formatted character string to create a structured character string, wherein the structured character string includes a quantity figure after each consecutively repeated number that identifies how many consecutive instances of a same number are in each consecutively repeated number; and
displaying, by one or more processors, the structured character string on the user interface by executing the display application.

4. The method of claim 1, wherein the first formatted character string is delivered by a message, and wherein the method further comprises:
determining, by one or more processors, the intended application based on a context of the message.

5. The method of claim 1, further comprising:
determining, by one or more processors, the intended application based on a most frequently used application in an application usage history of a particular user, wherein the most frequently used application uses the second format.

6. The method of claim 1, further comprising:
determining, by one or more processors, the intended application based on a most recently used application in an application usage history of a particular user, wherein the most recently used application uses the second format.

7. The method of claim 1, further comprising:
receiving, by an application programming interface (API) that is in communication with an operating system of a computer, a user input that identifies the intended application that uses the second format;
comparing, by the operating system, the second format to a model structured format for inputs to the intended application;
determining, by the operating system, whether the model structured format is inappropriate for inputs to the intended application;
in response to determining that the model structured format is inappropriate for inputs to the intended application, modifying, by the operating system, the model structured format to match the second format;
storing, by the operating system, the modified model structure format;
receiving, by the API, a second character string for use by the intended application; and
applying, by the API, the modified model structure format to the second character string in order to create a new input for the intended application.

8. The method of claim 1, wherein the second formatted character string is a telephone number, and wherein the method further comprises:
extracting, by one or more processors, an area code from the telephone number in order to identify a geographic area that uses the telephone number;
determining, by one or more processors, that the intended application uses an Internet-based telephone network for all calls to the geographic area; and
initiating, by one or more processors, a telephonic session in the Internet-based telephone network using the telephone number as an input to the intended application.

9. The method of claim 1, wherein the first formatted character string is in a first numbering format, wherein the second formatted character string is in a second numbering format, and wherein the first numbering format and the second numbering format differ according to a placement of separation commas in a numeric string.

10. The method of claim 1, further comprising:
displaying, by one or more processors, a list of the multiple applications on a user interface before enabling the execution of the intended application, wherein the multiple applications are not executable while being displayed in the list on the user interface;
displaying, by one or more processors, a function that is associated with the intended application from the list of multiple applications being displayed on the user interface, wherein the function is dependent upon use of the second formatted character string as an input to each of the multiple applications;
receiving, by one or more processors, a selection of the function that is associated with the intended application based upon the use of the second formatted character string as the input to the intended application; and
in response to receiving the selection of the function that is associated with the intended application, enabling, by one or more processors, execution of the intended application and using the second formatted character string as the input to the intended application.

11. The method of claim 1, wherein the first formatted character string is received by a local computer from a first remote computer via a first network, and wherein executing the intended application causes a second network to become active in order to enable a communication session between the local computer and a second remote computer via the second network.

12. The method of claim 1, further comprising:
determining, by one or more processors, the intended application is a banking application based on a length of the first formatted character string;
in response to determining that the intended application is a banking application based on the length of the first formatted character string, converting, by one or more processors, the first formatted character string into an account number used by the banking application; and
utilizing, by one or more processors, the account number to access information from the banking application.

13. A computer program product for controlling execution of an intended application, the computer program product comprising a non-transitory computer readable storage medium having program code embodied therewith, the program code readable and executable by a processor to perform a method comprising:
receiving a first formatted character string that is in a first format;
determining which application from multiple applications is an intended application that is to use the first formatted character string as a basis of an input to the intended application;
converting the first formatted character string into a second formatted character string by applying a second format that is required by the intended application;
executing the intended application by using the second formatted character string as an input to the intended application;
retrieving a model usage from a database located in an operating system used by a computer that receives the first formatted character string, wherein the computer is used by a current user, and wherein the model usage describes a data format of data used by the intended application, an application type of the intended application, and a user type of users that historically utilize the intended application;
matching a new data format of a new formatted character string, which is received by a new user, and a new user type of the new user to information in the model usage; and
in response to the new data format of the new formatted character string and the new user type of the new user matching the information in the model usage, utilizing the data format of data used by the intended application, the application type of the intended application, and the user type of users that historically utilize the intended application from the model usage to identify the intended application for use by the new user and to convert the first formatted character string into the second formatted character string for use by the intended application.

14. The computer program product of claim 13, wherein the method further comprises:
determining which application from the multiple applications is the intended application based on a length of the first formatted character string.

15. The computer program product of claim 13, wherein the first formatted character string is a string of numbers that includes a series of a consecutively repeated number, wherein the intended application is a display application for displaying numbers on a user interface, and wherein the method further comprises:
converting the series of the consecutively repeated number into a numeric series descriptor;
replacing the series of the consecutively repeated number with the numeric series descriptor in the first formatted character string to create a structured character string; and
displaying the structured character string on the user interface by executing the display application.

16. The computer program product of claim 13, wherein the program instructions are provided as a service in a cloud environment.

17. A computer system comprising:
one or more processors;
one or more computer readable memories; and
one or more non-transitory computer readable storage mediums, wherein program instructions are stored on at least one of the one or more non-transitory computer readable storage mediums for execution by at least one of the one or more processors via at least one of the one or more computer readable memories to perform a method comprising:
receiving a first formatted character string that is in a first format;
determining which application from multiple applications is an intended application that is to use the first formatted character string as a basis of an input to the intended application;
converting the first formatted character string into a second formatted character string by applying a second format that is required by the intended application;
executing the intended application by using the second formatted character string as an input to the intended application;
retrieving a model usage from a database located in an operating system used by a computer that receives the first formatted character string, wherein the computer is used by a current user, and wherein the model usage describes a data format of data used by the intended application, an application type of the intended application, and a user type of users that historically utilize the intended application;
matching a new data format of a new formatted character string, which is received by a new user, and a new user type of the new user to information in the model usage; and
in response to the new data format of the new formatted character string and the new user type of the new user matching the information in the model usage, utilizing the data format of data used by the intended application, the application type of the intended application, and the user type of users that historically utilize the intended application from the model usage to identify the intended application for use by the new user and to convert the first formatted character string into the second formatted character string for use by the intended application.

18. The computer system of claim 17, wherein the computer system is part of a cloud environment, and wherein the program instructions are executed by the computer system as a service in the cloud environment.

* * * * *